BEST AVAILABLE COPY

Jan. 11, 1949. L. E. SIMMONS Re. 23,078

MINING MACHINE

Original Filed April 17, 1941 4 Sheets-Sheet 1

Inventor:
Leon E. Simmons.
by
Arthur A. Maxson
Atty.

BEST AVAILABLE COPY

Jan. 11, 1949. L. E. SIMMONS Re. 23,078

MINING MACHINE

Original Filed April 17, 1941 4 Sheets-Sheet 2

Inventor:
Leon E. Simmons.
by
Louis A. Maxson
Atty.

BEST AVAILABLE COPY

Jan. 11, 1949. L. E. SIMMONS Re. 23,078

MINING MACHINE

Original Filed April 17, 1941 4 Sheets-Sheet 3

Inventor:
Leon E. Simmons.
by
Louis A. Maxson
Atty.

BEST AVAILABLE COPY

Jan. 11, 1949. L. E. SIMMONS Re. 23,078

MINING MACHINE

Original Filed April 17, 1941 4 Sheets-Sheet 4

Inventor:
Leon E. Simmons.
by
Louis A. Maxson,
Atty.

BEST AVAILABLE COPY

Reissued Jan. 11, 1949

Re. 23,078

BEST AVAILABLE COPY

UNITED STATES PATENT OFFICE 23,078

MINING MACHINE

Leon E. Simmons, Claremont, N. H., assignor to Joy Manufacturing Company, a corporation of Pennsylvania Original No. 2,349,311, dated May 23, 1944, Serial No. 389,016, April 17, 1941. Application for reissue May 7, 1945, Serial No. 592,297

6 Claims. (Cl. 262—30)

This is an application for reissue of Letters Patent No. 2,349,311, granted May 23, 1944.

This invention relates to mining machines, and more particularly, but not exclusively, to improvements in coal mining machines of the flexibly fed, room and pillar type.

An object of the present invention is to provide an improved coal mining machine of a relatively simple, rugged and compact construction. Another object is to provide an improved and novel motor arrangement whereby the vertical dimensions of the machine may be kept at a minimum. A further object is to provide an improved coal mining machine having improved kerf cutting mechanism. Yet another object is to provide an improved arrangement of the machine motor with respect to the cutter bar of the kerf cutting mechanism wherein a portion of the motor is recessed within the cutter bar to reduce the overall height of the machine. A still further object is to provide an improved cutter bar construction for a coal mining machine. Another object is to provide an improved coal mining machine of the room and pillar type wherein the cutter bar projects horizontally beneath the machine motor to enable discharge of the cuttings from the rear of the machine and is constructed with the view of keeping the vertical dimensions of the machine as low as possible. Another object is to provide an improved motor and cutter bar construction wherein guides for the cutter chain are secured to the motor casing, and the bottom portion of the latter is recessed within the cutter bar. Other objects and advantages of the invention will, however, hereinafter more fully appear as the description proceeds.

In the accompanying drawings there is shown for purposes of illustration one form which the invention may assume in practice.

Figure 1:
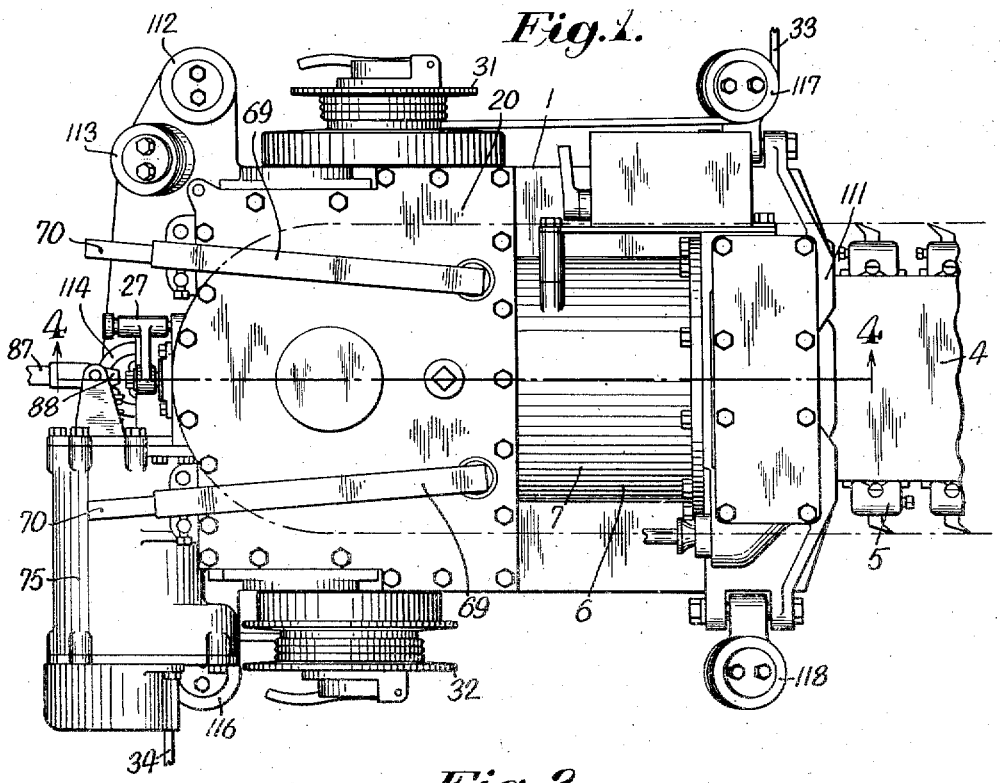
Fig. 1 is a plan view of a coal mining machine constructed in accordance with an illustrative embodiment of the invention.
Figure 2:
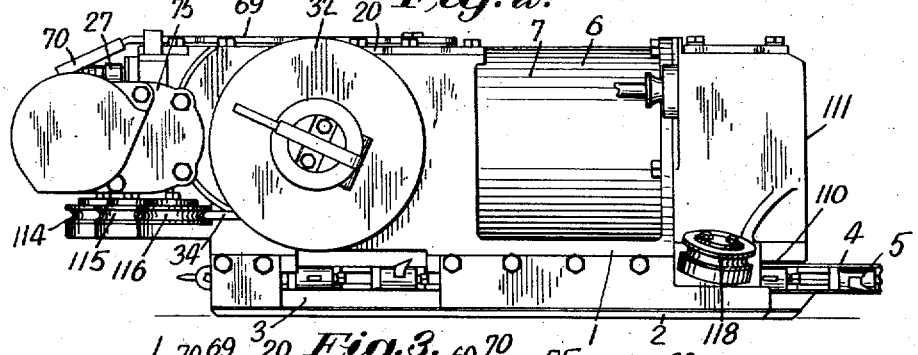
Fig. 2 is a side elevational view of the mining machine shown in Fig. 1.
Figure 3:
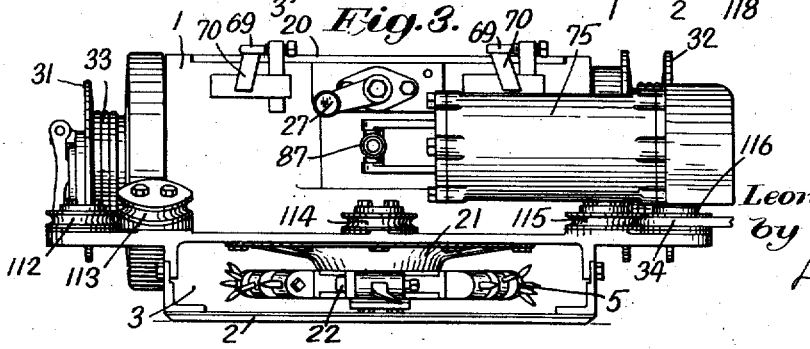
Fig. 3 is a rear end elevational view of the mining machine.

In this illustrative embodiment of the invention there is shown a coal mining machine of the flexibly fed, room and pillar type adapted to rest upon and slide in any direction over the mine floor. It will be evident, however, that various features of the invention, without departing from its spirit, may be incorporated in coal mining machines of various other types.

In this illustrative construction, the mining machine comprises a main frame 1 mounted on a bottom skid plate 2 which slides on the mine floor. These together constitute the machine frame. Extending longitudinally through the bottom of the machine frame is a horizontal chamber 3 having arranged and supported therein the rearward portion of a cutter bar 4 of an improved design. The cutter bar projects forwardly of the machine frame and has an endless cutter chain 5 movable thereabout in an orbital path. A motor 6 is mounted within the forward portion of the main frame and has its casing 7 integral with the main frame, and the motor casing has its lower portion recessed within the cutter bar in a novel manner to be later fully explained. The rearward portion of the main frame is formed to provide a chamber 8 within which elements of the kerf cutting mechanism and the machine feeding means are arranged, as will also be described.

The motor 6 is herein an electric motor and has an armature 9 keyed to an armature shaft 10. The motor has compound wound field coil assemblies 11, and arranged between these coils are commutating pole and coil assemblies 12. The lower one of the field coil assemblies 11 is arranged in part below a horizontal plane in which the

BEST AVAILABLE COPY top surface of the cutter bar lies and within the orbit of the endless cutter chain. The armature shaft 10 of the motor is horizontally disposed and extends longitudinally of the machine with its axis of rotation lying in the central longitudinal vertical plane of the machine, and is suitably journaled within the motor casing. It will be observed that the motor windings are contained within a cylindrical chamber formed within the motor casing 7.

Now referring to the cutter chain driving means, it will be noted that secured to the rear end of the motor armature shaft 10 is a bevel pinion 13 meshing with a large horizontal bevel gear 14 having its hub keyed to a vertical hollow shaft 15. Extending through the hollow shaft 15 is a vertical shaft 16, and the shaft 15 is journaled on ball bearings supported by the shaft 16, in the manner shown in Fig. 4. Formed on the upper portion of the hollow shaft 15 are clutch teeth 17 connectible by a sliding clutch member 18 to the teeth of a clutch member 19 keyed to the upper end of the shaft 16. The upper end of the shaft 16 is journaled through the hub of the member 19 in a ball bearing supported by the detachable top cover plate 20 of the main frame. The shaft 16 is journaled near its lower end within ball bearings supported by a detachable bottom plate 21. Keyed to the lower end of the shaft 16 and driven thereby and arranged in the chamber 3 is a chain sprocket 22 which engages and drives the endless cutter chain 5. It will thus be seen that when the clutch member 18 is connected the cutter chain may be driven from the motor through the bevel gears 13, 14, hollow shaft 15, the vertical shaft 16 and the cutter chain sprocket 22. The operating means for the clutch member 18 comprises a shipper yoke 23 pivotally mounted at 24 within the main frame and having its rearward portion engaged by a crank 25. This crank is formed on an operating shaft 26 suitably journaled within the rear wall of the main frame and has secured thereto an operating handle 27.

The flexible feeding means comprises a feed drum 31 and a controlling or retarding drum 32, these drums being arranged rearwardly of the motor at the opposite sides of the main frame on horizontal axes extending transversely of the machine. Respectively wound on these drums are feeding and controlling cables 33 and 34. These cable winding drums are respectively journaled on stub shafts 35 and 36 projecting laterally from detachable brackets 37 and 38 secured to the opposite sides of the main frame, and arranged between the drum hubs and the stub shafts are eccentric bushings whereby the drums may be freed from their driving gearings, in a manner fully described in Patent No. 2,131,178 in which I am coinventor. As these eccentric bushing drum release devices do not per se enter into this invention, further description thereof is unnecessary.

The drum driving means, in this instance, comprises a worm 39 formed on the vertical hollow shaft 15 and meshing with a worm wheel 40 having its hub keyed to a horizontal shaft 41. This shaft extends transversely of the main frame rearwardly of the shaft 15 and is suitably journaled within ball bearings supported within bearing brackets 42. Secured to the shaft 41 is a spur pinion 43 meshing with an internal gear 44 having its hub journaled on a ball bearing supported by a stub shaft 45, the latter having a pressed fit within a bore in the adjacent bracket 42. Alined with the stub shaft 45 is a shaft 46 journaled at its inner end on a roller bearing supported by the stub shaft 45 and at its outer end within a ball bearing supported by the adjacent drum bracket 37. The internal gear 44 is connectible to the shaft 46 by a conventional multiple disc clutch 47, and the shaft has keyed thereto and drives a spur gear 48 meshing with an internal gear 49 on the feed drum 31. Also secured to the shaft 41 is a spur gear 50 meshing with a spur gear 51 journaled on a ball bearing supported by a stub shaft 52. This stub shaft has a pressed fit within a bore in the adjacent bracket 42, in a manner similar to the stub shaft 45. Alined with this stub shaft is a shaft 53 journaled at its inner end on a roller bearing supported by the stub shaft 52 and at its outer end within a ball bearing supported within the adjacent bracket 38. The gear 51 is connectible to the shaft 53 by a conventional multiple disc clutch 54. The shaft 53 has keyed thereto and drives a spur gear 55 meshing with an internal gear 56 on the controlling drum 32. Coaxial with the clutch 54 is a brake 57 for retarding rotation of the controlling drum 32 when the friction clutch is released, in the manner to be later explained. This brake comprises a sleeve 58 keyed to the shaft 53, and connected to this sleeve is a series of friction plates which are interleaved with a series of friction plates connected to a sleevelike member 59 rigidly secured to the adjacent drum bracket 38.

The clutches 47 and 54 and the brake 57 have operating means including shipper rings 60 and 61 slidable relative to the shafts 46 and 53, respectively, and having projecting fingers engageable with the end pressure plates of the clutches and brake. Since the actuating means for the shipper rings are identical, a description of the actuating means for the shipper ring 61 will suffice for both. Engaged in an annular groove on the shipper ring 61 is a shipper yoke 62 pivotally mounted on a vertical shaft 63 secured within the machine frame. The shipper yoke has an integral lever arm 64 provided with a guide slot 65 extending radially with respect to the yoke pivot axis, and engaged in this guide slot is a ball bearing thrust roll 66 carried by a crank 67 integral with a vertical operating shaft 68. This shaft is suitably journaled within a bearing bracket integral with the cover plate 20 and has an operating handle 69 extending rearwardly over the top of the main frame. This operating lever has a grasping portion 70 conveniently located at the rear end of the machine. When the clutch levers are swung inwardly, the shipper rings 60, 61 are moved toward one another, thereby to effect application of the disc clutches 47 and 54, and when the levers are swung outwardly the clutches are released. Further outward movement of the lever controlling the clutch shipper ring 61 effects loading of the discs of the brake 57. It is accordingly evident that the feed drum 31 may be driven in cable winding direction at a relatively low feeding speed through the worm gearing 39, 40, pinion 43, internal gear 44, the clutch 47, shaft 46 and the gear 48 meshing with the internal gear 49 on the feed drum, under the control of the disc clutch. The controlling or retarding drum 32 may be driven in cable winding direction at a relatively high speed through the worm gearing 39, 40, spur gearing 50, 51, clutch 54, shaft 53, and the gear 55 meshing with the internal gear 56 on the drum, under the control of the disc clutch 54. Also, ro-

BEST AVAILABLE COPY tation of the controlling drum 32 in cable unwinding direction may be frictionally resisted by the disc brake 57. By adjusting the eccentric bushings for the drum hubs relative to the stub shafts, the drums may be moved eccentrically to throw out the drum gears from meshing engagement with their driving gears, thereby to obtain free drum rotation. This feature, which is well known in the art, permits easy winding of the cables on the drums by hand.

The feeding and controlling drums 31 and 32 and their driving gearings may be transposed to the opposite sides of the main frame so that the machine may operate from right to left instead of from left to right as shown. Upon such transposition of parts, it is necessary to provide new drum brackets, but otherwise no additional parts are needed. It is accordingly evident that by but slight modification the machine may be readily transformed into a left to right machine. This is highly desirable since some mines operate the coal mining machines in one direction under certain conditions and in the other direction under other conditions. The feed mechanism just described as well as the truck drive means hereinafter described, are described and claimed in my copending application Serial No. 414,721, now abandoned, which is a division of this application.

Figure 6:
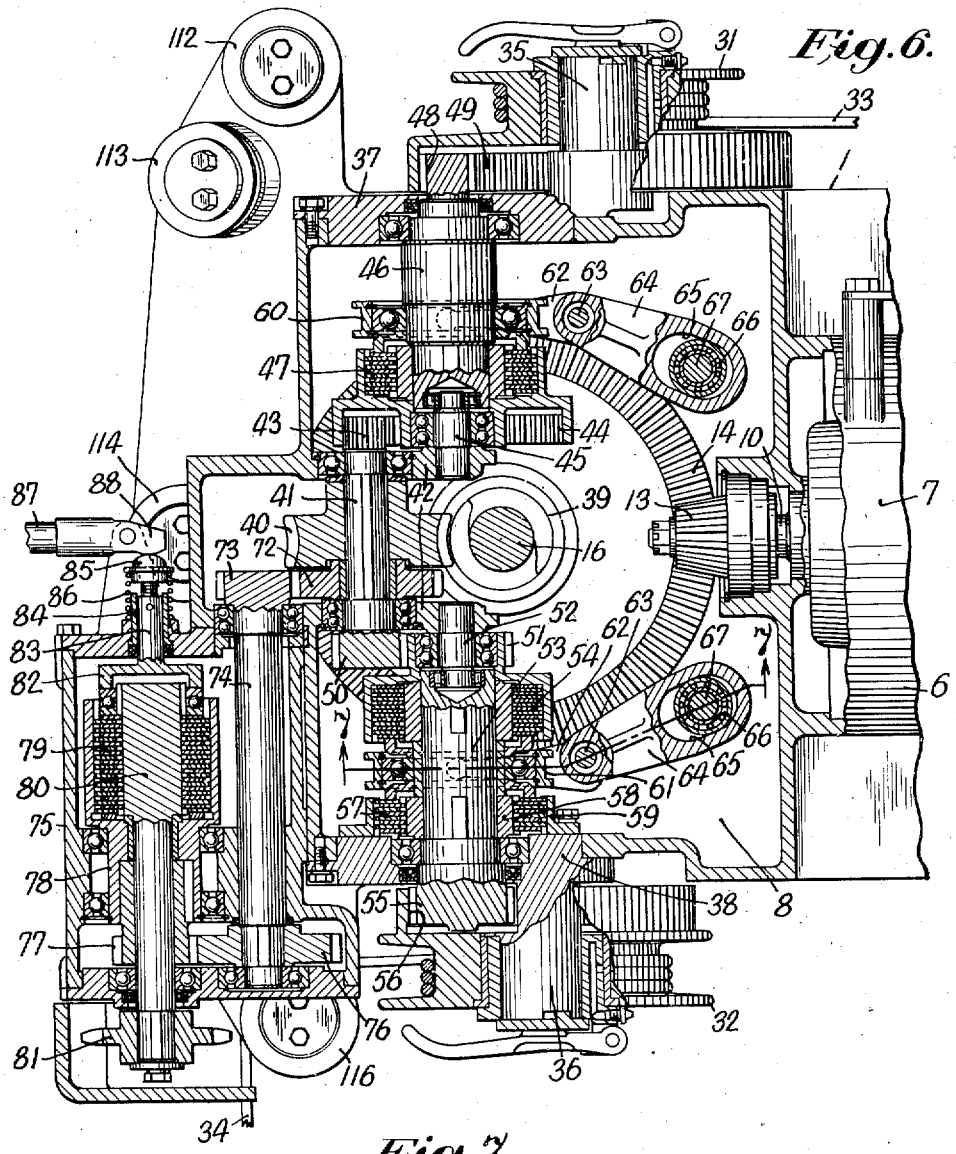
Fig. 6 is a horizontal sectional view taken substantially on line 6—6 of Fig. 4.
Figure 7:
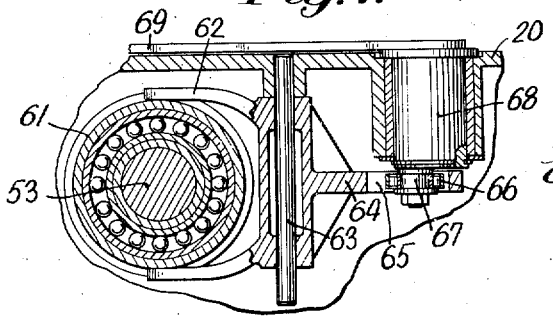
Fig. 7 is a detail sectional view taken on line 7—7 of Fig. 6.

Provision is made whereby the machine motor may effect drive of the propelling means of a transport truck, and this truck driving means comprises, as shown most clearly in Fig. 6, a spur gear 72 keyed to and driven by the shaft 41. This gear meshes with a spur gear 73 secured to a parallel shaft 74 suitably journaled within a housing 75 attached to the rear end of the main frame. Keyed to and driven by this shaft is a spur gear 76 meshing with a spur gear 77 having its hub keyed to a sleevelike member 78 journaled within the housing 75. This sleevelike member is connectible by a conventional multiple disc clutch 79 to a coaxial shaft 80 likewise suitably journaled within the housing. Keyed to and driven by this shaft is a chain sprocket 81 adapted to engage an endless drive chain (not shown) of the truck propelling means. This clutch is operable by a clutch-applying member 82 having a rodlike portion 83 slidably guided in a bushing 84 supported within the housing 75. This member 82 has fingers engageable with the end pressure plate of the clutch. Interposed between a flange on a member 85 (adjustably secured to the rodlike portion 83 of the clutch-applying member) and the housing, is a coil spring 86 for yieldingly urging the clutch-applying member towards its released position. Pivotally mounted on the housing is a lever 87 having a projection 88 engageable with the member 85. It will thus be seen that the truck propelling means may be driven from the machine motor through the bevel gears 13, 14, worm gears 39, 40, spur gears 72, 73 and spur gears 76, 77 under the control of the disc clutch 79.

Figure 8:
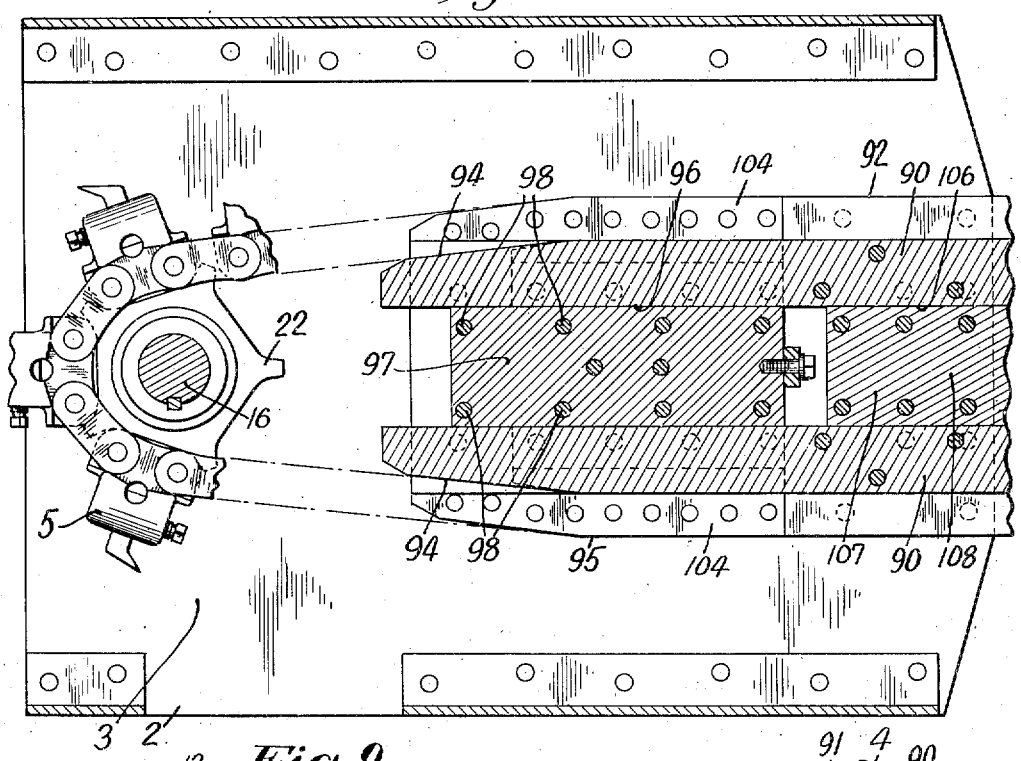
Fig. 8 is a horizontal sectional view taken substantially on line 8—8 of Fig. 4.
Figure 9:
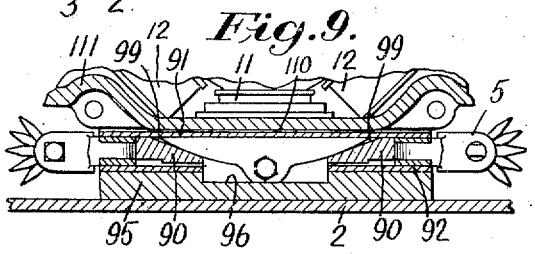
Fig. 9 is a fragmentary cross sectional view taken on line 9—9 of Fig. 4.
Figure 10:
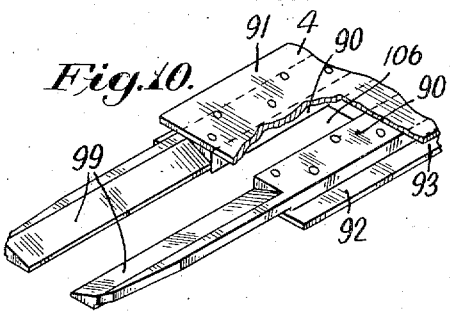
Fig. 10 is a perspective view of the rearward portion of the cutter bar.
Figure 11:
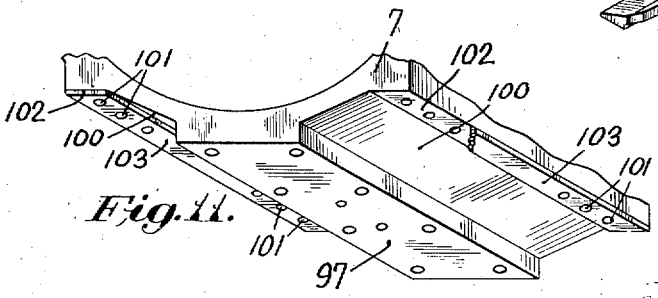
Fig. 11 is a fragmentary perspective view of the bottom portion of the motor casing.

Now referring to the improved structure of the cutter bar 4, it will be noted that secured, in a suitable manner, as by rivets, to parallel side bars 90, 90 are top and bottom plates 91 and 92. These plates cooperate with the side bars to provide a guideway 93 about the margin of the cutter bar and in this guideway the endless cutter chain 5 may be circulated for orbital movement. This cutter chain extends about the cutter chain guideways through the chamber 3 within the lower part of the main frame and around the cutter chain driving sprocket 22, in the manner clearly shown in Fig. 8, and the side bars of the cutter bar are laterally inwardly inclined at 94 to direct the cutter chain into proper relation with the cutter chain sprocket. Suitably secured, as by rivets, to the bottom skid plate 2 and extending longitudinally within the chamber 3 in a position midway between the sides of the main frame is a bottom step plate 95 having on its upper surface a centrally located longitudinal groove or slot 96, and the casing 7 of the motor has a rectangular bottom projection 97 fitted within this groove or slot and suitably rigidly secured, as by screws 98, to the step plate 95. The upper sides of the rearward portions of the side bars 90, 90 are relatively inwardly inclined or converge inwardly at 99, and the surfaces of these inclined portions engage complemental inclined surfaces 100, 100 on the bottom portion of the motor casing 7, in the manner clearly shown in Fig. 5. These rearward portions of the side bars extend longitudinally along the opposite sides of the bottom motor projection 97. Suitably detachably secured, as by screws 101, to bottom plane surfaces 102 on the motor casing are liners 103, and similar liners 104 are suitably secured, as by rivets, to the side flanges of the step plate, and these liners cooperate to provide the side guiding surfaces for the cutter chain, so that when the chain leaves the guide surfaces of the top and bottom plates 91, 92 it moves between and is guided by these liners on the motor casing and step plate. The lower bar plate 92 is centrally slotted at 106, and a bar hanger 107 suitably secured, as by rivets, to the bottom skid plate, has a portion 108 fitted within this slot between the side bars 90, 90, in the manner shown in Fig. 8. This bar hanger provides guideways along which the cutter bar is slidably guided, so that the bar may be adjusted by conventional means (not shown) to tighten the cutter chain. During bar adjustment the surfaces of the rearward side bar projections slidingly engage the complemental surfaces on the motor casing and bottom step plate, in an obvious manner.

To maintain the proper power characteristics of the motor and to conserve in its height, the bottom field coil assembly 11 of the motor is recessed within the cutter bar, in the manner above explained, thereby to reduce the effective height of the machine. Thus, the motor casing is constructed so that a portion thereof is beneath and is intersected by a horizontal plane, indicated constructively at P in Fig. 5, in which plane is the line traced by the cutting points of the uppermost bits; and the outermost limits of the orbit of the cutter chain lie outside of the vertical projection of the lateral boundaries of the motor casing. A horizontal plane parallel with and below the plane P intersects the cutter chain, the cutter bar and the depending portion of the motor casing, and the depending motor casing portion extends below a horizontal plane in which the bottom surface of the cutter bar lies. Also, as above explained, the motor casing provides a support for one of the guiding elements for the cutter chain and also provides an extremely stable support for the rearward portion of the cutter bar. Furthermore, the lowest portions of the lowest field pole, and indeed of the lowest field coil, extend below the horizontal plane at the top of the cutter bar.

Figures 4, 5:
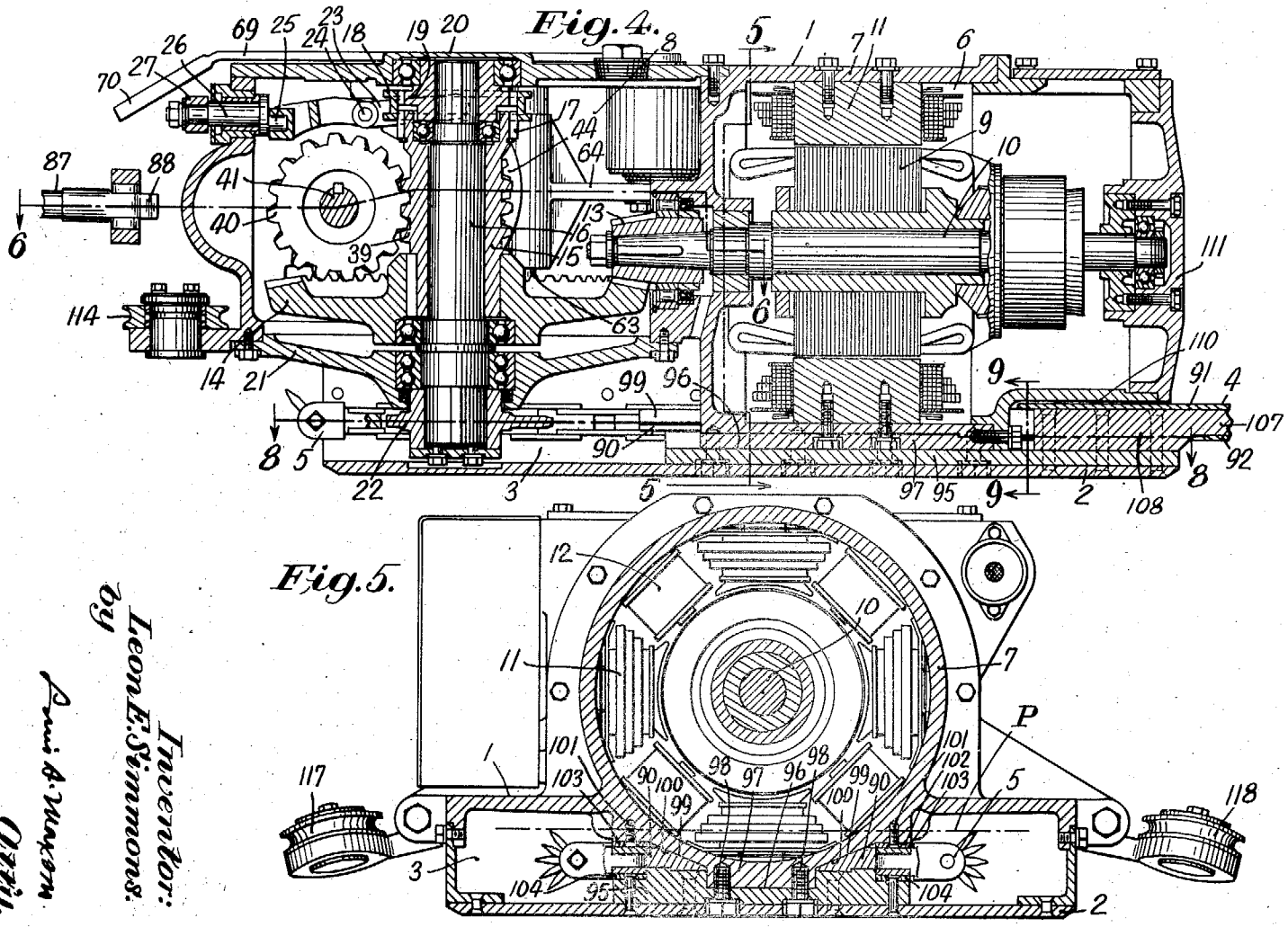
Fig. 4 is an enlarged view in longitudinal vertical section taken substantially on line 4—4 of Fig. 1.
Fig. 5 is a cross sectional view taken substantially on line 5—5 of Fig. 4.

As shown in Fig. 4, the rearward portions of the top and bottom plates 91 and 92 of the cutter bar terminate within a recess 110 beneath a detach-

BEST AVAILABLE COPY able front head 111 of the motor, and the bar hanger 107 is, in part, located within this recess. Also, as illustrated, the rear ends of the side bars 90, 90 of the cutter bar terminate at points slightly rearwardly of the bottom step plate 95 in the space between the rear end of the latter and the chain sprocket 22. It is evident that as the cutter chain is circulated in its orbit about the margin of the cutter bar, the cuttings created by the cutting action of the chain are moved through the bottom chamber 3 to discharge at the rear end of the machine and the opposite runs of the cutter chain move through the chamber along the opposite sides of the bottom portion of the motor casing. The horizontal plane P, indicated diagrammatically in Fig. 5, lies at the top of the cutter chain orbit and intersects the bottom field coil assembly 11 and the bottom of the motor casing, in the manner shown. By the construction provided, the motor and cutter bar are rendered extremely vertically compact, and by utilizing a part of the motor casing as a support for guiding elements for the cutter chain, the structure is simplified and made more rugged. In summary, it may be noted that the cylindrical chamber containing the motor windings conforms to the surface of a solid of revolution, and that this chamber is symmetrical with respect both to a horizontal plane in which its axis lies, and also with respect to a vertical plane in which its axis lies. Further, this chamber is so arranged that not only does a horizontal plane at the top of the cutter chain orbit cut through it, but so also does a horizonal plane which passes through the top chain guides, and even a horizontal plane midway between the top and bottom of the chain orbit. Moreover, the motor casing is in so low a position that the distance by which the bottom of the chamber mentioned is separated from the bottom of the skid plate 2 is less than the vertical dimension of the cutter chain orbit.

The general mode of operation of a coal mining machine of the type disclosed is well known to those skilled in the art, and, therefore, a detailed description thereof is considered unnecessary. The machine is provided, in a usual manner, with a number of suitably located rear guide sheaves 112, 113, 114, 115 and 116 and a pair of front guide sheaves 117, 118, and the feeding and controlling cables 33, 34 may be extended from their respective drums in various directions around these guide sheaves, in a well known manner, and the free ends of the cables may be anchored at remote points near the ribs of the room at the opposite sides of the coal face. The machine may be fed forwardly in an endwise direction near one rib to sump the cutter bar beneath the coal. Thereafter the machine may be fed laterally to move the cutter bar transversely across the coal face, and finally the machine may be angled with respect to the other rib and moved rearwardly to withdraw the cutter bar from beneath the coal to complete the cut. During the various operations of the machine, the feed drum 31 may be rotated at a relatively low cutting speed under the control of the disc clutch 47 in a direction to wind in the feed cable 33, and the controlling drum 32 may be rotated in cable unwinding direction under the control of the brake 57. If desired, the controlling drum 32 may be driven at a relatively high speed in cable winding direction under the control of the disc clutch 54. When the cutter chain drive clutch member 18 is connected, the cutter chain may be rapidly circulated within its guideways along the bottom of the main frame and about the margin of the cutter bar, and when this clutch member is released the cutter chain may remain idle during running of the motor. The propelling means of the machine transport truck may be driven from the machine motor under the control of the disc clutch 79.

As a result of this invention it will be noted that an improved coal mining machine of relatively simple, rugged and compact construction is provided having an improved and novel motor and cutter bar arrangement whereby the vertical dimensions of the machine are rendered extremely compact. It will also be noted that by recessing the motor within the cutter bar and by providing guides for the cutter chain on the bottom of the motor casing, the motor is not only rendered extremely low in height but also the cutter chain is guided in an improved manner. Other uses and advantages of the improved mining machine will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a mining machine, the combination comprising a horizontal plane cutter bar having spaced apart parallel rearward portions, a cutter chain movable in an orbit about the margin of said cutter bar, and a horizontal motor for driving said cutter chain having a motor casing provided with a bottom projection, a bottom step plate, the rearward bar portions extending along the opposite sides of said motor casing projection and engaging surfaces on said step plate and the bottom of said motor casing, and a bar hanger mounted upon said step plate and having a portion projecting between said rearward bar portions and with which said cutter bar is slidingly engaged.

2. In combination, in a mining machine, a horizontal plane cutter bar having spaced apart parallel rearward portions and also forward portions carrying upper and lower chain guides, a cutter chain movable in an orbit about the margin of said cutter bar, a horizontal motor for driving said cutter chain having a motor casing having a bottom portion of substantially less width than the maximum width of said motor and its portion of maximum width disposed above the cutter bar, and a bottom step plate, said rearward bar portions extending along opposite sides of the bottom of said motor casing and engaging surfaces on said step plate and on the bottom of the motor casing, and the motor and cutter bar being so arranged and constructed that the motor extends down below the top of the cutter bar to such an extent that the lowermost points in the inner surface of said casing are below a horizontal plane passing through said upper chain guides, and said motor casing having secured to it guides constituting extensions of said upper chain guides.

3. In combination, in a mining machine, a horizontal plane cutter bar having spaced apart parallel rearward portions and also forward portions carrying upper and lower chain guides, a cutter chain movable in an orbit about the margin of said cutter bar, a horizontal motor for driving said cutter chain having a motor casing hav-

BEST AVAILABLE COPY ing a bottom portion of substantially less width than the maximum width of said motor and its portion of maximum width disposed above the cutter bar, said rearward bar portions extending along opposite sides of the bottom of said motor casing and engaging surfaces on the bottom of said motor casing, the motor and cutter bar being so arranged and constructed that the motor extends down below the top of the cutter bar to such an extent that the lowermost points in the inner surface of the casing are below a horizontal plane passing through said upper chain guides, and said motor casing having upon it guides constituting extensions of said upper chain guides.

4. In combination, in a mining machine, a horizontal plane cutter bar having spaced apart parallel rearward portions and also forward portions carrying upper and lower chain guides, a cutter chain movable in an orbit about the margin of said cutter bar, a horizontal motor for driving said cutter chain having a motor casing having a bottom portion of substantially less width than the maximum width of said motor and its portion of maximum width disposed above the cutter bar, and a bottom step plate, said rearward bar portions extending along opposite sides of the bottom of said motor casing and engaging surfaces on said step plate and on the bottom of the motor casing, and the motor and cutter bar being so arranged and constructed that the motor extends down below the top of the cutter bar to such an extent that the lowermost points in the inner surfaces of said casing are below a horizontal plane passing through said upper chain guides, and said motor casing and said step plate having secured to them guides constituting extensions of said upper and lower chain guides respectively.

5. In combination, in a mining machine, a horizontal plane cutter bar having spaced apart parallel rearward portions and also forward portions carrying upper and lower chain guides, a cutter chain movable in an orbit about the margin of said cutter bar, a horizontal motor for driving said cutter chain having a motor casing having a bottom portion of substantially less width than the maximum width of said motor and its portion of maximum width disposed above the cutter bar, and a bottom step plate, said rearward bar portions extending along opposite sides of the bottom of said motor casing and engaging surfaces on said step plate and on the bottom of the motor casing, and said step plate and motor casing constituting a guiding and supporting structure for said rearward bar portions, the motor and cutter bar being so arranged and constructed that the motor extends down below the top of the cutter bar to such an extent that the lowermost points in the inner surfaces of said casing are below a horizontal plane passing through said upper chain guide, and said guiding and supporting structure also carrying guides cooperating directly with horizontal surfaces on the cutter chain for guiding the latter during its orbital movement.

6. In combination, in a mining machine, a horizontal plane cutter bar, a cutter chain comprising chain elements movable in an orbit about the margin of said cutter bar, and cutter chain driving means including a motor comprising a rotor and a stationary field structure whose elements are at least substantially uniformly arranged about said rotor, said motor arranged with the lower portion of its field structure within the cutter chain orbit and having a casing providing mutually oblique cutter bar-guiding surfaces at least the upper portions of which are higher than the lowest portion of said field structure, said cutter bar having spaced rearwardly extending portions having surfaces cooperating with said mutually oblique surfaces on said motor casing, and said motor casing and said cutter bar having coplanar horizontal chain guiding surfaces thereon.

LEON E. SIMMONS.

REFERENCES CITED

The following references are of record in the file of this patent:

UNITED STATES PATENTS

| Number | Name | Date |
|---|---|---|
| 1,127,697 | Trotter | Feb. 9, 1915 |
| 1,742,178 | Maxson | Dec. 31, 1929 |
| 1,931,560 | Simmons | Oct. 24, 1933 |
| 2,075,870 | Sloane | Apr. 6, 1937 |
| 2,190,924 | Joy | Feb. 20, 1940 |